United States Patent
Widholzer et al.

(10) Patent No.: US 9,486,069 B2
(45) Date of Patent: Nov. 8, 2016

(54) VIBRATION-DAMPED FURNITURE PIECE IN THE FORM OF A TABLE

(75) Inventors: Georg Widholzer, Frasdorf (DE); Josef Widholzer, Frasdorf (DE)

(73) Assignee: Steelcase Inc., Grand Rapids, MI (US)

( * ) Notice: Subject to any disclaimer, the term of this patent is extended or adjusted under 35 U.S.C. 154(b) by 72 days.

(21) Appl. No.: 14/368,156

(22) PCT Filed: Dec. 22, 2011

(86) PCT No.: PCT/EP2011/006532
§ 371 (c)(1),
(2), (4) Date: Jun. 23, 2014

(87) PCT Pub. No.: WO2013/091671
PCT Pub. Date: Jun. 27, 2013

(65) Prior Publication Data
US 2014/0367538 A1    Dec. 18, 2014

(51) Int. Cl.
| | |
|---|---|
| F16L 15/00 | (2006.01) |
| A47B 13/00 | (2006.01) |
| A47B 13/02 | (2006.01) |
| A47B 9/20 | (2006.01) |
| A47B 13/06 | (2006.01) |
| F16F 15/08 | (2006.01) |

(52) U.S. Cl.
CPC .............. *A47B 13/02* (2013.01); *A47B 9/20* (2013.01); *A47B 13/06* (2013.01); *F16F 15/08* (2013.01)

(58) Field of Classification Search
CPC ........ A47B 13/02; F16F 15/02; F16F 15/04; F16F 15/08; F16L 55/035
USPC .............. 248/188.1, 562, 636, 644, 638; 108/57.12
See application file for complete search history.

(56) References Cited

U.S. PATENT DOCUMENTS

| | | | | |
|---|---|---|---|---|
| 3,917,201 A | * | 11/1975 | Roll ..................... | A47B 13/02 248/550 |
| 6,209,841 B1 | * | 4/2001 | Houghton, Jr. ......... | F16F 13/00 248/638 |
| 2010/0102187 A1 | * | 4/2010 | Walraven .............. | F16L 55/035 248/274.1 |
| 2014/0367538 A1 | * | 12/2014 | Widholzer .............. | A47B 9/20 248/188.1 |

FOREIGN PATENT DOCUMENTS

| | | |
|---|---|---|
| DE | 9000138 | 3/1990 |
| EP | 1080667 | 3/2001 |
| EP | 1223832 | 9/2003 |
| WO | WO 2008/046906 | 4/2008 |

OTHER PUBLICATIONS

International Search Report for PCT/EP2011/006532, mailed Feb. 15, 2012.

* cited by examiner

*Primary Examiner* — Tan Le
(74) *Attorney, Agent, or Firm* — Price Heneveld LLP (57) ABSTRACT

A furniture piece in the form of a table comprises a table frame with two table leg structures, which are connected to one another by at least one connecting brace. Fastening brackets for fastening the connecting brace are provided on the table leg structures. The table frame has a vibration-damping device that operates between the connecting brace and at least one fastening bracket in order to damp lateral vibrations of the furniture piece.

11 Claims, 7 Drawing Sheets

VIBRATION-DAMPED FURNITURE PIECE IN THE FORM OF A TABLE

This application is the U.S. national phase of International Application No. PCT/EP2011/006532, filed 22 Dec. 2011, the entire content of which is hereby incorporated by reference.

The present invention relates to a piece of furniture in the form of a table in accordance with the preamble of claim 1.

Tables which are known from the prior art generally have a table frame with two table leg structures which are spaced apart from each other, which are interconnected by means of a connecting strut which is usually arranged directly beneath a table leaf. Each table leg structure usually has at its upper end a fastening bracket to which the connecting strut is rigidly fastened.

A table with such a table frame has the problem that a vibration, which is initiated in particular by a person laterally bumping into the table or by another lateral application of force, lasts for a relatively long time once initiated. Such disruptive lateral vibrations, in particular in the case of tables with long legs, for example in the case of vertically-adjustable tables with extendable table legs, are a problem, since the vibrations take a particularly long time to fade away in such case.

It is an object of the invention to provide a piece of furniture of the type mentioned at the outset in which lateral vibrations fade away again rapidly once they have been initiated.

This object is achieved by a piece of furniture having the features of claim 1. Advantageous configurations are described in the dependent claims.

According to the invention, the table frame has a vibration-damping means which acts between the connecting strut and at least one fastening bracket for damping lateral vibrations of the piece of furniture. Lateral vibrations as a result fade away substantially more quickly than without such a vibration-damping means.

Preferably the connecting strut can be fastened to at least one fastening bracket by means of at least one elastically yielding vibration-damping element. When a lateral force is exerted, and upon the resulting lateral vibrational motion of the piece of furniture, the angle changes between the connecting strut and the respective table leg structures, as a result of which the vibration-damping element is elastically deformed. Owing to the elastic deformation of the vibration-damping element, the vibration of the piece of furniture can be damped effectively, so that the vibration amplitudes of the piece of furniture are quickly reduced and the period of vibration is shortened.

Preferably the vibration-damping element is in the form of an elastic collar which extends over the end region of the connecting strut at least over the predominant part of the region of overlap of the fastening bracket and the connecting strut. In other words, at least one collar surrounds at least one end region of the connecting strut. Alternatively, separate elastic mats, pads or elastic coatings in the end region of the connecting strut could also be provided between the connecting strut and the fastening bracket.

A configuration of the vibration-damping element as a collar is particularly simple in terms of design and inexpensive and simple to assemble. Preferably the vibration-damping element is held solely by clamping between the fastening bracket and the connecting strut.

Alternatively, a connecting strut can also be provided, the end regions of which consist of an elastically deformable material, in which case the end regions then form the vibration-damping elements.

In a further preferred embodiment, the connecting strut can be fastened to the fastening bracket at at least one of its end regions by means of a first and a second fastening means. The first fastening means in this case is arranged further to the outside in the longitudinal direction of the connecting strut, whereas the second fastening means is arranged further to the inside and can be fastened to the fastening bracket via the vibration-damping element.

Preferably the vibration-damping element comprises an elastomeric element and a fastening element, the fastening element lying against the elastomeric element, and said elastomeric element lying against the fastening bracket. The connecting strut can be connected to the fastening element by means of the second fastening means, for example by means of a screw. Preferably in this case the fastening element is arranged on an inner side-wall side of the fastening bracket, the elastomeric element being arranged between the fastening element and the inner side-wall side of the fastening bracket. The connecting strut in this case can be located on top of the fastening bracket. The second fastening means is expediently guided from the outside through the side wall of the connecting strut, and also with lateral play through a lateral opening in the fastening bracket and is connected to the fastening element, as a result of which the connecting strut is elastically clamped against the fastening bracket in this region.

With a corresponding configuration of the piece of furniture according to the invention, the connecting strut in its respective end regions can simply be pushed over the respective fastening brackets, so that the fastening brackets are held in the connecting strut. This permits simple and rapid assembly of the table frame. Furthermore, with a corresponding construction of the table, the fastening brackets are not visible in the assembled state.

Preferably the fastening element has a spacer which is guided through an opening in the side wall of the fastening bracket and projects over an outer side-wall side of the fastening bracket. The spacer then lies from the inside against a side wall of the connecting strut which is pushed over the fastening bracket. This ensures that when fastening the connecting strut to the fastening bracket the connecting strut maintains a certain play relative to the fastening bracket in the region of the second fastening means, as a result of which the desired relative movement between the connecting strut and the fastening bracket, which is damped by the elastomeric element, is made possible in this region.

Alternatively to the embodiment of the vibration-damping elements which is illustrated, these may also be realised in the form of silentblocs which are arranged in each case between the fastening bracket and the connecting strut.

The invention will now be explained further below with reference to embodiments. Therein, the following are shown in detail.

In the description which now follows, identical reference numerals designate identical components or identical features, so that a description given in relation to one figure with respect to one component also applies to the other figures, and repetitive description is avoided.

Figure 1:
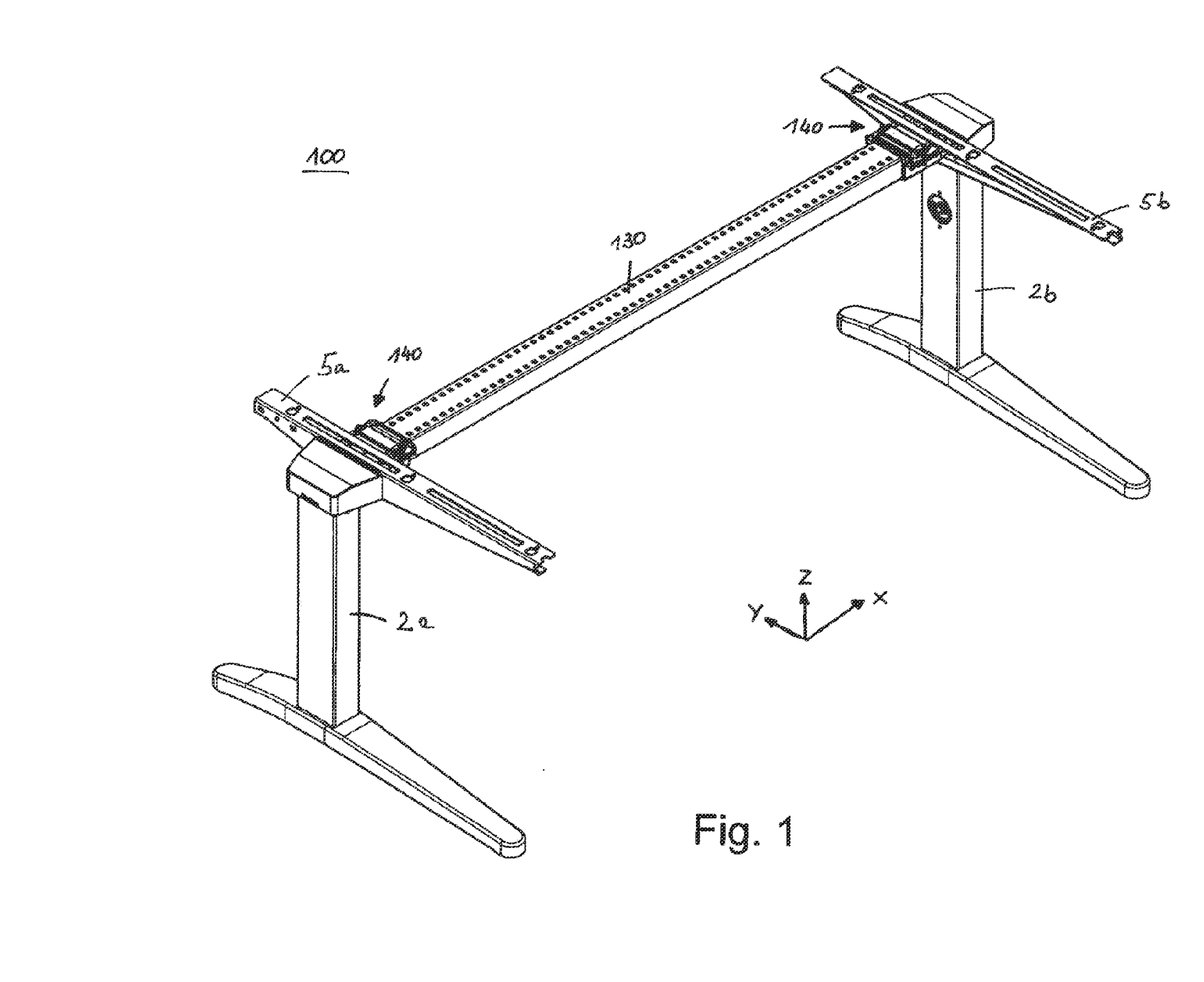
FIG. 1: a perspective view of a table according to the invention according to a first embodiment of the invention.

FIG. 1 shows a perspective view of a table frame 100 of a piece of furniture in the form of a table, in accordance with a first embodiment of the present invention. The table leaf of the piece of furniture has been omitted for clarity. The table frame 100 comprises two table leg structures 2a, 2b which are spaced apart from each other, which in each case comprise a table leg and a table foot. The table leg structures 2a, 2b arranged on both sides of the table frame 100 are interconnected by a connecting strut 130. The two table leg structures 2a, 2b have in each case a fastening bracket 140 to which the end regions of the connecting strut 130 are connected in each case. Between the respective fastening brackets 140 and the table legs of the table leg structures 2a, 2b there is provided in each case a table-leaf fastening strut 5a, 5b, to which a table leaf can be connected for example by means of screws. The table frame 100 has a breadth extending in the X-direction or in the lateral direction, a depth extending in the Y-direction and a height extending in the Z-direction.

Figure 2:
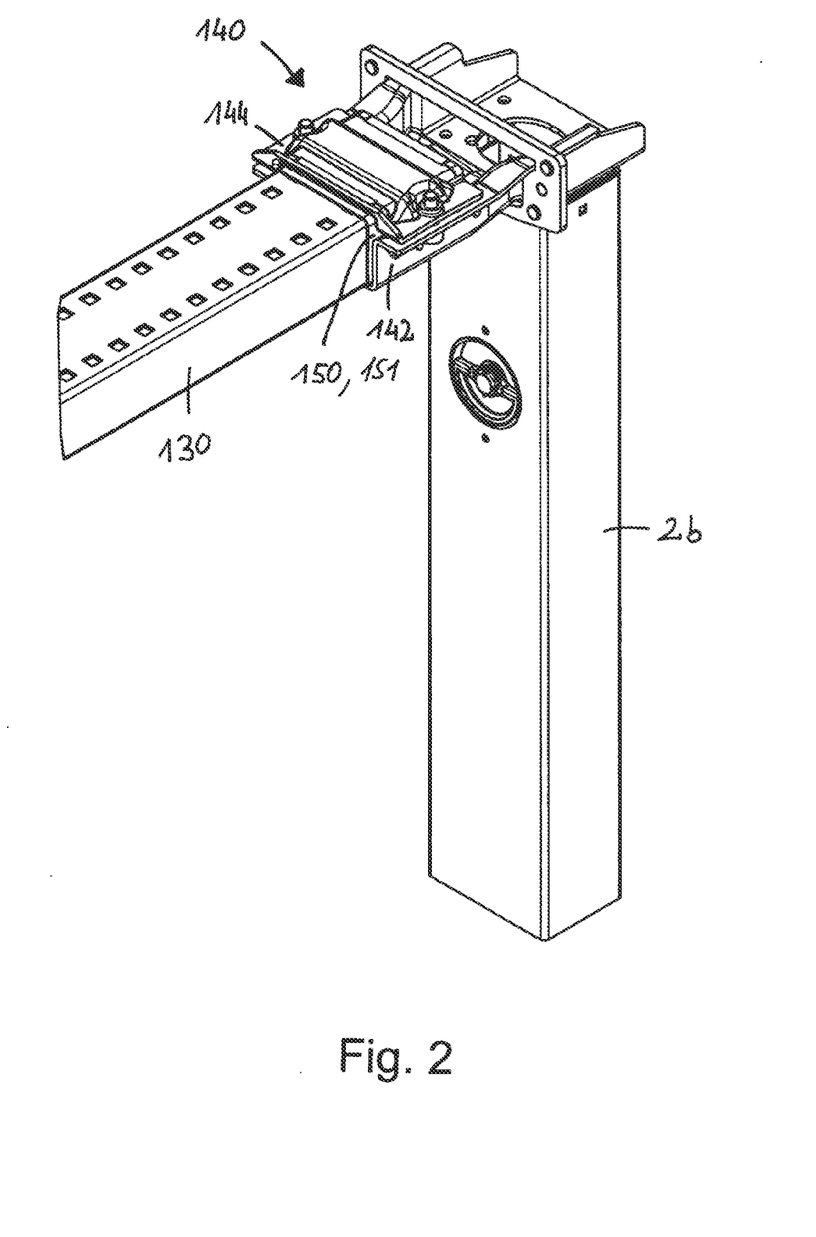
FIG. 2: an enlarged perspective view of the table illustrated in FIG. 1, only one table leg structure which is connected to a connecting strut being illustrated.

FIG. 2 shows an enlarged perspective view of the table frame 100 illustrated in FIG. 1, only the table leg structure 2b which is connected to the connecting strut 130 via the fastening bracket 140 being illustrated. The table leg structure 2a is connected correspondingly to the connecting strut 130.

It can be seen from FIG. 2 that the connecting strut 130 is fastened at the end to the fastening bracket 140 by means of a vibration-damping element 150. The vibration-damping element 150 is consequently arranged on an end region of the connecting strut 130. Furthermore, it can be seen from FIG. 2 that the vibration-damping element 150 is arranged between the fastening bracket 140 and the connecting strut 130. The vibration-damping element 150 forms a vibration-damping means for damping lateral vibrations of the piece of furniture.

Figure 3:
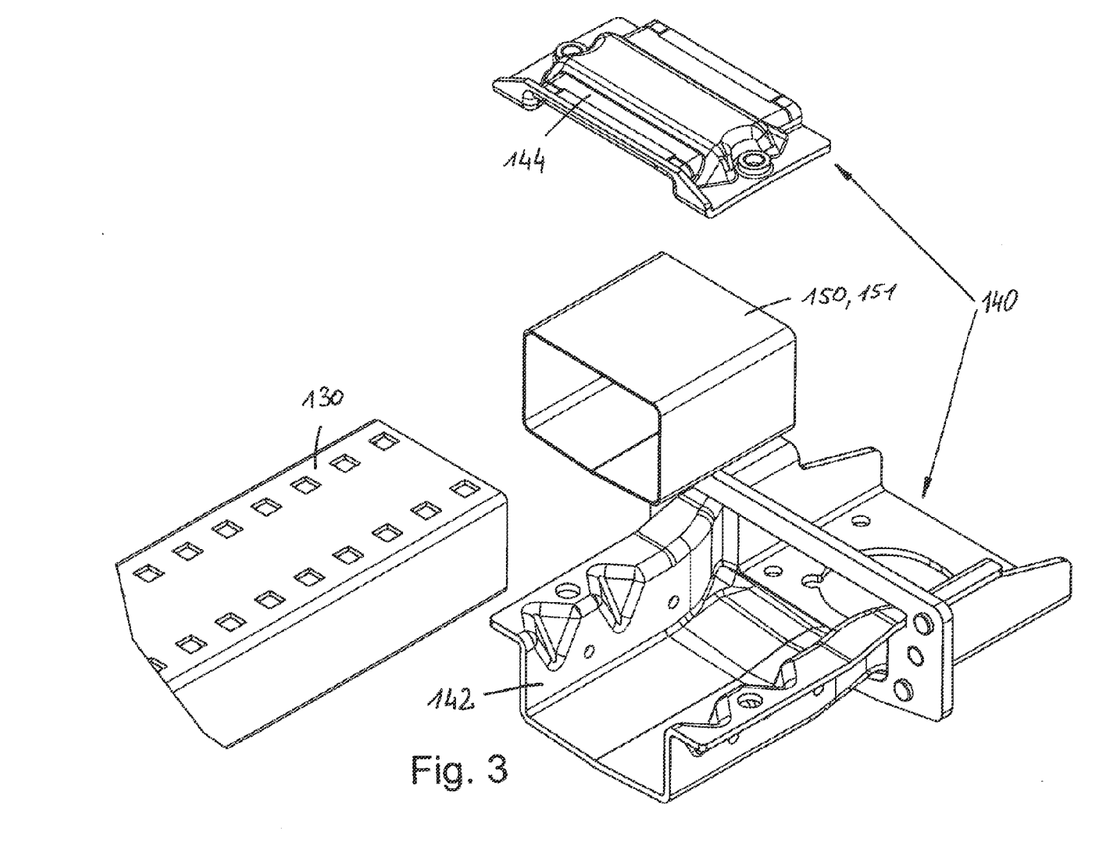
FIG. 3: a perspective exploded view of the table illustrated in FIGS. 1 and 2 in the region of connection between the connecting strut and a fastening bracket.
Figure 4:
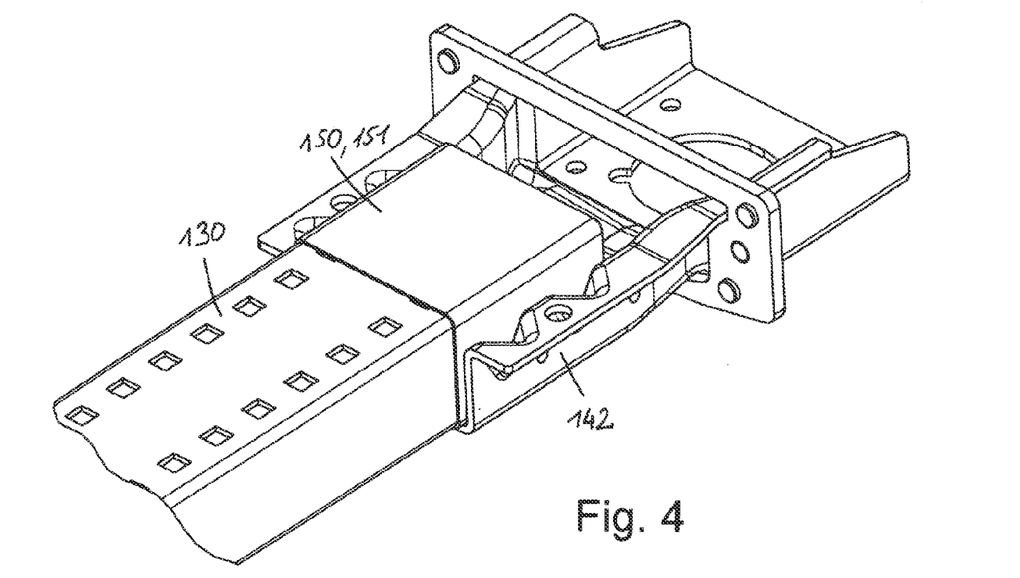
FIG. 4: a perspective view of the structural elements of FIG. 3 in the assembled state without an upper fastening-bracket shell.
Figure 5:
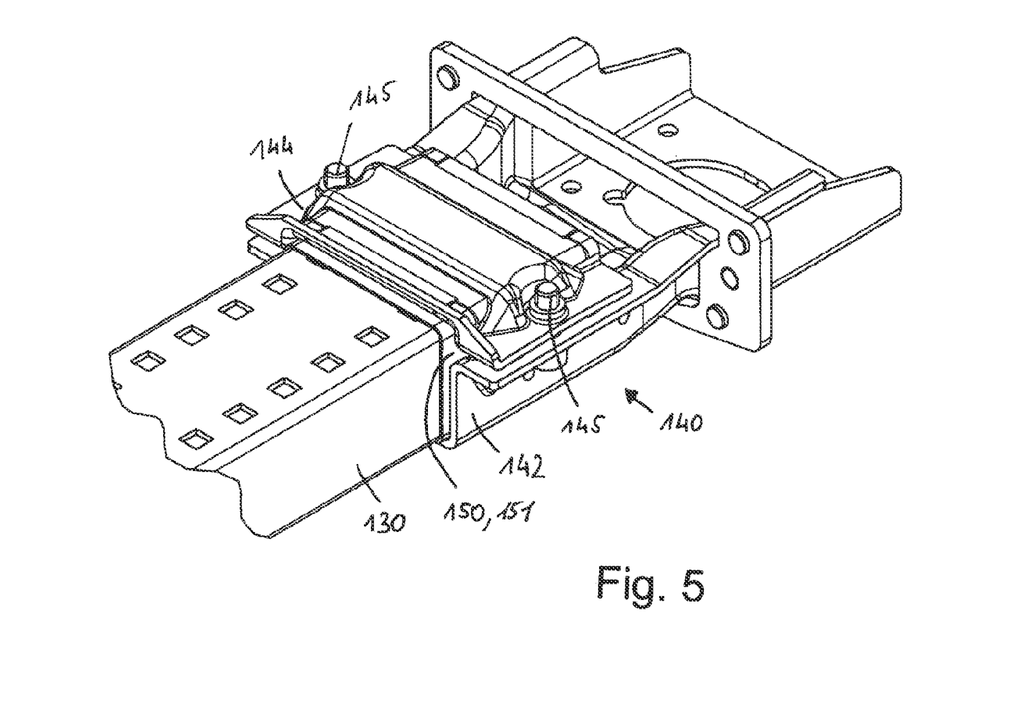
FIG. 5: an illustration corresponding to FIG. 4 with an assembled upper fastening-bracket shell.

FIG. 3 shows a perspective exploded view of the section illustrated in FIG. 2, only the connecting strut 130, a fastening bracket 140 and the vibration-damping element 150 being illustrated. The fastening bracket 140 comprises a lower shell 142 and an upper shell 144, which can be interconnected by means of a screw connection. FIG. 4 shows a perspective view of the assembled structural elements of FIG. 3 without the upper shell 144, and FIG. 5 shows the assembly of FIG. 4 with the upper shell 144 assembled.

It can be seen from the figures that the vibration-damping element 150 is in the form of a collar 151. The collar 151 can be drawn or pulled over the end region of the connecting strut 130. In this case, the collar 151 consists of an elastically deformable material, for example rubber or a rubber-like or foam-like material.

Alternatively, the vibration-damping element 150 may also be configured as an elastomeric mat which is wound around the end region of the connecting strut 130, so that two end sides of the mat lie edge-to-edge if wound around the end region of the connecting strut 130.

Furthermore, flat mat elements which are separated from each other could also be provided on the individual sides of the connecting strut 130.

FIG. 4 shows that the collar 151 covers the entire end region of the connecting strut 130 in which the connecting strut 130 and the fastening bracket 140 overlap.

FIG. 5 shows that the collar 151 is clamped between the end region of the connecting strut 130 and the lower shell 142 and the upper shell 144 of the fastening bracket 140, by the upper shell 144 being fastened to the lower shell 142 by means of screws 145. Thus the connecting strut 130 is elastically separated from the fastening bracket 140 by means of the collar 151.

Upon a force being exerted in the X-direction (FIG. 1) and upon the lateral vibrations of the table which are initiated thereby, the angle, which is usually of 90°, between the connecting strut 130 and the table leg structures 2a and 2b changes continuously. In such case, changing bending forces in the Z-direction take effect in the regions of overlap between the fastening brackets 140 and the connecting strut 130, which forces deform the collar 151. Since the collar 151 consists of an elastically deformable material, the collar 151 counteracts the vibration, so that the period of vibration of the table after a lateral action of force in the X-direction is reduced and the table moves back into the initial position earlier.

Figure 6:
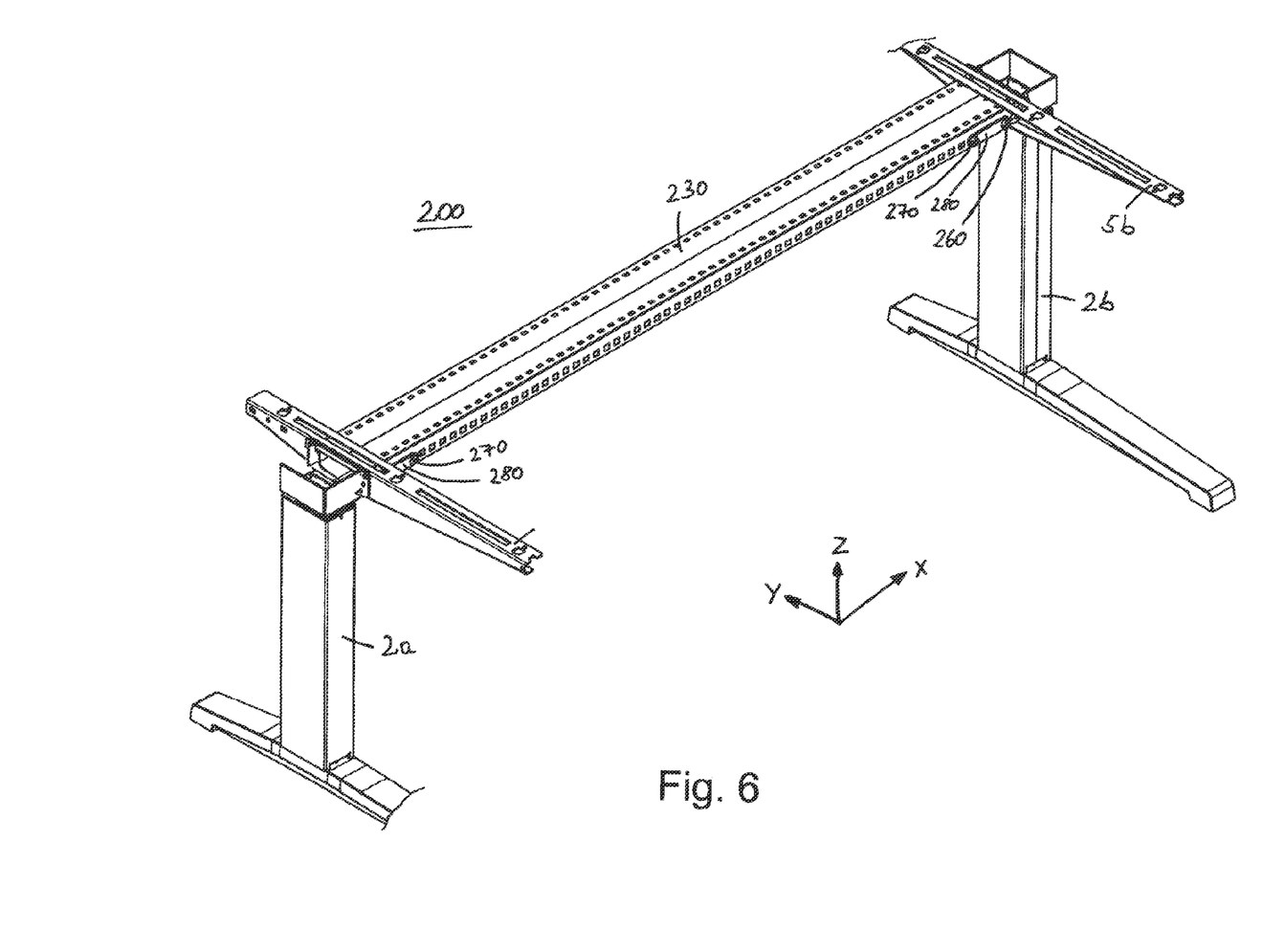
FIG. 6: a perspective view of a table frame according to a second embodiment of the invention.

FIG. 6 shows a perspective view of a table frame 200 of a piece of furniture according to the invention in the form of a table according to a second embodiment of the invention. The table frame 200 illustrated in FIG. 6 is similar to the table frame 200 illustrated in FIG. 1, with, in the case of the table frame 200 in accordance with the second embodiment, the connecting brackets 240, which cannot be seen in FIG. 6, being held in an inner space in the end regions of the connecting strut 230. The table-leaf fastening struts 5a, 5b are connected to the respective fastening brackets 240 by means of screw connections.

Figure 7:
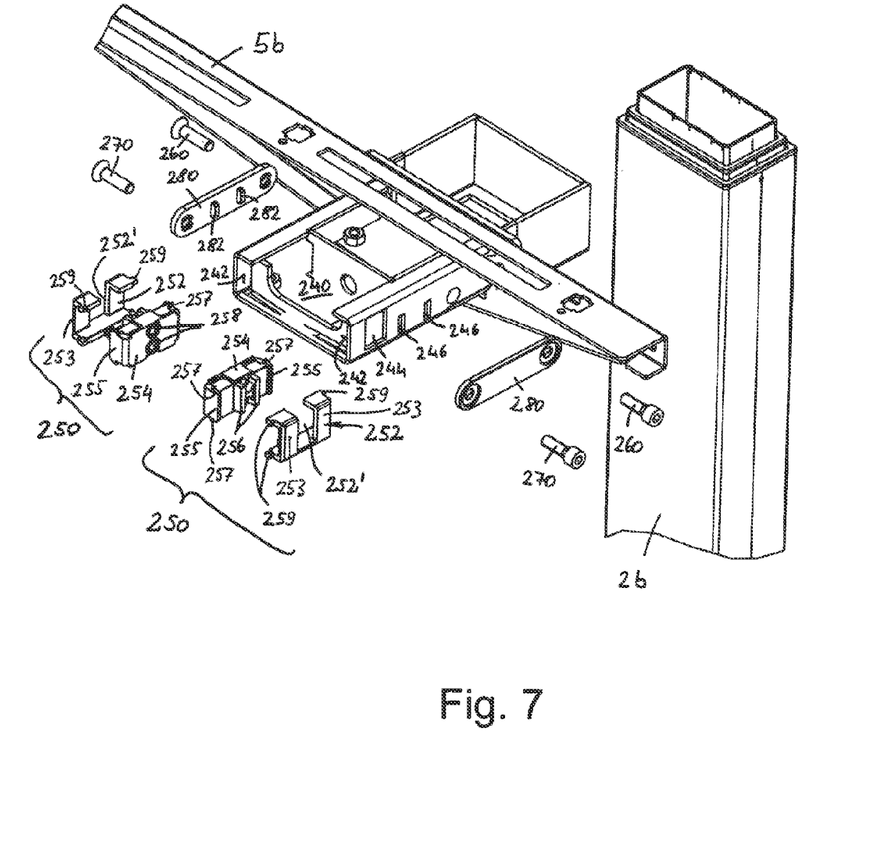
FIG. 7: a perspective exploded view of the piece of furniture according to the invention in accordance with the second embodiment in the region of connection of the fastening bracket.
Figure 8:
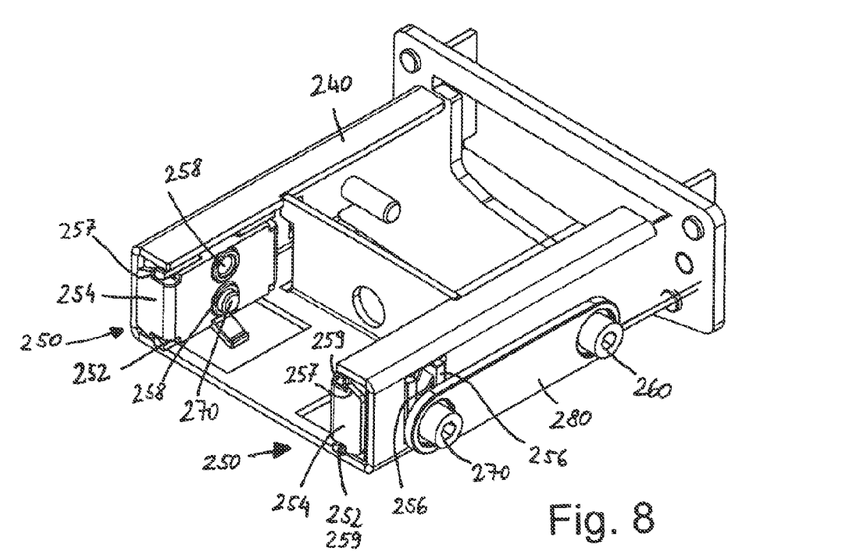
FIG. 8: a perspective view of some essential structural elements of FIG. 7 in the assembled state without a connecting strut.
Figure 9:
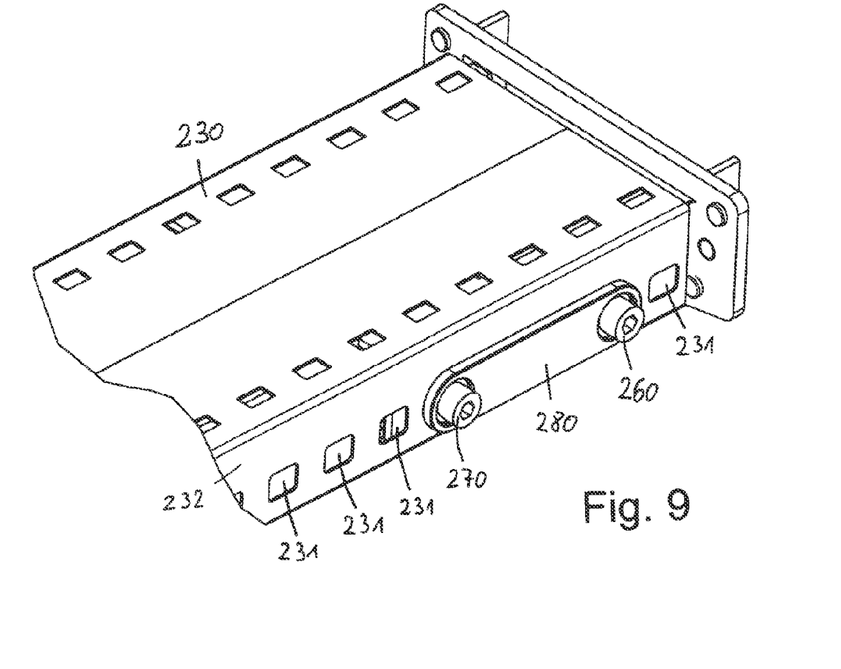
FIG. 9: the section illustrated in FIG. 8 with a connecting strut connected to the fastening bracket.

The construction of the fastening bracket 240 plus vibration-damping elements 250 can be seen from FIG. 7, which shows a perspective exploded view of the table frame 200 in accordance with the second embodiment in the region of connection of a fastening bracket 240. FIG. 8 shows a perspective view of the fastening bracket 240 of FIG. 7 with assembled vibration-damping elements 250, and FIG. 9 shows the components illustrated in FIG. 8, the connecting strut 230 being pushed over the fastening bracket 240 and being connected thereto.

The vibration-damping elements 250 in each case comprise an elastomeric element 252 and a fastening element 254 which can be connected to the elastomeric element 252. The elastomeric element 252 consists of an elastically yielding material, for example rubber or a rubber-like material. The fastening element 254 in turn consists of a hard plastics material or of a metal, for example aluminium or steel. The vibration-damping elements 250 form a vibration-damping means for damping lateral vibrations of the piece of furniture.

The elastomeric element 252 has first connecting means 253 in the form of bent tabs which partially engage over and under the fastening element 254 and can be located on the fastening element 254 in a latchable manner. The latching takes place by means of projections 259 on the edge, which engage behind projections 257 on the edge which form a second connecting means 255. The second connecting means 255 can thus engage in the first connecting means 253, so that the elastomeric element 252 and the fastening element 254 can be interconnected via a snap connection.

The fastening element 254 further has a spacer 256 in the form of two bars, which in the assembled state project through a cutout 252' in the elastomeric element 252. Furthermore, each fastening element 254 has in each case two threaded bushes 258, into which a fastening screw 270 can be screwed.

The vibration-damping elements 250 which are thus constructed and put together are arranged on inner side-wall sides 242 of the fastening bracket (see FIG. 8). In this case, the elastomeric element 252 is located between the fastening element 254 and the inner side-wall side 242 of the fastening bracket 240. The spacer 256 is guided with lateral play through a lateral opening 244 in the fastening bracket 240, and projects out of the lateral opening 244 and thus out of the fastening bracket 240.

As can be seen from FIG. 9, the connecting strut 230 is located on the fastening bracket 240, so that the fastening bracket 240 in the assembled state of the table 200 is arranged in an inner space of the end region of the connecting strut 230. The connecting strut 230 is fastened to the fastening bracket 240 in its respective end regions with a first fastening means in the form of a fastening screw 260 which is arranged further to the outside in the longitudinal direction of the connecting strut 230, and with a second fastening means in the form of the fastening screw 270 which is arranged further to the inside. In this case, the second fastening screw 270 is connected not directly to the fastening bracket 240, but to the fastening element 254 of the vibration-damping element 250, in that the fastening screw 270 is screwed into the internally-threaded bush 258. The second fastening screw 270 in this case is guided with lateral play both through a lateral opening 231 in the connecting strut 230 and through the additional lateral opening 244 in the fastening bracket 240.

The spacer 256 of the fastening elements 254 is guided in each case with lateral play through the lateral openings 244 in the fastening bracket 240, and projects laterally somewhat over the fastening bracket 240. The spacer 256, in the assembled state, then lies from the inside against a side wall 232 of the connecting strut 230. The first fastening screw 260 and the second fastening screw 270 are interconnected on the side wall 232 of the connecting strut 230 by means of a fastening tab 280. The fastening tab 280 has two positioning pins 282, facing the fastening bracket 240, which in an assembled state project both through lateral openings 231 in the connecting strut 230 and through positioning openings 246 in the fastening bracket 240. The positioning pins 282 and the positioning openings 246 of the fastening bracket 240 thus serve for simplified assembly.

If a lateral force is exerted in the X-direction of the table 200 (see FIG. 6), the angle between the connecting strut 230 and the table leg structures 2a, 2b changes. Since the connecting strut 230 is connected directly to the fastening bracket 240 by means of the first fastening screws 260, the first fastening screws 260 serve as a type of rotation spindle between the connecting strut 230 and the fastening brackets 240. Thus a relative rotary movement of the fastening bracket 240 in the connecting strut 230 is made possible.

Since the fastening brackets 240 are however also connected to the connecting strut 230 by means of the vibration-damping elements 250, the elastomeric element 252 of the vibration-damping element 250, upon a change in the angle between the connecting strut 230 and the table leg structures 2a, 2b, is elastically deformed slightly, predominantly in the Z-direction. For a change in the angle between the connecting strut 230 and the table leg structures 2a, 2b results in a relative rotation of the fastening brackets 240 in the connecting strut 230 about the rotation spindles, which are defined by the fastening screws 260, so that the vibration-damping elements 250 are acted upon by the second fastening screws 270 and thus are elastically deformed. The fastening element 254 of the vibration-damping element 250 has sufficient play within the fastening bracket 240 to permit slight relative movements. Owing to the elastic deformation of the elastomeric elements, lateral vibrations of the table frame 200 are damped, so that the period of vibration is reduced accordingly.

LIST OF REFERENCE NUMERALS 2a, 2b table leg structure
5a, 5b table-leaf fastening strut
100 table frame
130 connecting strut
140 fastening bracket
142 lower shell of the fastening bracket
144 upper shell of the fastening bracket
145 screw
150 vibration-damping element, collar
151 collar
200 table frame
230 connecting strut
232 side wall (of the connecting strut)
240 fastening bracket
242 inner side-wall side (of the fastening bracket)
244 lateral opening (in the fastening bracket)
246 positioning opening (in the fastening bracket)
250 vibration-damping element
252 elastomeric element
252' cutout (in the elastomeric element)
253 first fastening means (of the elastomeric element)
254 fastening element
255 second connecting means (of the fastening element)
256 spacer (of the fastening element)
257 projections (of the fastening element)
258 internally-threaded bush (of the fastening element)
259 projections (of the elastomeric element)
260 first fastening screw
270 second fastening screw
280 fastening tab
282 positioning pin (of the fastening plate)

The invention claimed is:
1. A piece of furniture in the form of a table, comprising:
a table frame which has at least two spaced-apart table leg structures and at least one connecting strut which connects the table leg structures;
the table leg structures have in each case a fastening bracket or are connected in each case to a fastening bracket;
the connecting strut is configured to be fastened to the table leg structures via the fastening brackets; and the table frame has a vibration-damping member which acts between the connecting strut and at least one of the fastening brackets for damping lateral vibrations of the piece of furniture;
wherein at least one end region of the connecting strut is fastened to the fastening bracket with a first fastener which is arranged further to an outside in a longitudinal direction of the connecting strut and a second fastener which is arranged further to an inside via the vibration-damping element.

2. The piece of furniture according to claim 1, wherein:
the vibration-damping member comprises at least one elastically yielding vibration damping element, via which the connecting strut is fastened to at least one fastening bracket; and
the vibration-damping element being elastically deformed when an angle changes between the connecting strut and the table leg structures.

3. The piece of furniture according to claim 2, wherein the at least one vibration-damping element is arranged on at least one end region of the connecting strut.

4. The piece of furniture according to claim 2, wherein the at least one vibration-damping element is arranged between the fastening bracket and the connecting strut.

5. The piece of furniture according to claim 2, wherein the vibration-damping element is clamped by the fastening bracket, so that the connecting strut is fastened to the fastening bracket via the vibration-damping element.

6. The piece of furniture according to claim 2, wherein:
the vibration-damping element comprises an elastic collar; and
the collar extends over the end region of the connecting strut at least over a predominant part of a region of overlap of the fastening bracket and the connecting strut.

7. The piece of furniture according to claim 1, wherein:
the vibration-damping element comprises an elastomeric element and a fastening element which is connected to the elastomeric element;
the fastening element is configured to be connected to the fastening bracket indirectly via the elastomeric element; and
the connecting strut is fastened to the fastening bracket via the fastening element.

8. The piece of furniture according to claim 7, wherein:
the fastening element is arranged on an inner side-wall side of the fastening bracket;
the elastomeric element is arranged between the fastening element and the inner side-wall side of the fastening bracket;
the at least one end region of the connecting strut extends over the fastening bracket, so that said bracket is arranged in an inner space of the at least one end region of the connecting strut; and
the second fastener is guided with lateral play both through a lateral opening in the connecting strut and through a further lateral opening in the fastening bracket and is connected to the fastening element.

9. The piece of furniture according to claim 8, wherein:
the fastening element has a spacer which is guided with lateral play through the lateral opening in the fastening bracket and projects beyond the fastening bracket; and
the spacer lies from the inside against a side wall of the connecting strut.

10. The piece of furniture according to claim 7, wherein:
the elastomeric elements has at least a first connector;
the fastening element has at least a second connector; and
the first connector and the second connector are configured such that the elastomeric element is connected to the fastening element via a snap connection.

11. A piece of furniture in the form of a table, comprising:
a table frame including at least two spaced-apart table leg structures and at least one connecting strut which connects the table leg structures, the table leg structures each including a fastening bracket or being connected to a fastening bracket, the connecting strut being configured to be fastened to the table leg structures via the fastening brackets, the table frame further including a vibration-damping element configured to act between the connecting strut and at least one fastening bracket to damp lateral vibrations of the piece of furniture, wherein at least one end region of the connecting strut is fastened to the fastening bracket with a first fastener which is arranged further to an outside in a longitudinal direction of the connecting strut and a second fastener which is arranged further to an inside via the vibration-damping element.

* * * * *